(12) United States Patent
Otani (10) Patent No.: US 9,776,475 B2
(45) Date of Patent: Oct. 3, 2017

(54) GLASS SUPPORT MEMBER

(71) Applicant: AGC Automotive Window Systems Co., Ltd., Haga-gun (JP)

(72) Inventor: Sachio Otani, Haga-gun (JP)

(73) Assignee: AGC Automotive Window Systems Co., Ltd., Haga-gun (JP)

( * ) Notice: Subject to any disclaimer, the term of this patent is extended or adjusted under 35 U.S.C. 154(b) by 0 days.

(21) Appl. No.: 14/946,103

(22) Filed: Nov. 19, 2015

(65) Prior Publication Data

US 2016/0159205 A1 Jun. 9, 2016

(30) Foreign Application Priority Data

Dec. 4, 2014 (JP) .................. 2014-246173

(51) Int. Cl.
*B60J 1/00* (2006.01)
(52) U.S. Cl.
CPC .............. *B60J 1/006* (2013.01); *B60J 1/005* (2013.01); *B60J 1/007* (2013.01)
(58) Field of Classification Search
CPC ............. B60J 1/006; B60J 1/005; B60J 1/007
USPC ......................................... 296/146.15, 96.21
See application file for complete search history.

(56) References Cited

U.S. PATENT DOCUMENTS 7,686,266 B2 * 3/2010 Torigoe ................... F16B 5/065
24/297
8,516,770 B2 * 8/2013 Bissinger ................. B60J 1/006
296/146.15

FOREIGN PATENT DOCUMENTS

| JP | 55-99435 A | 7/1980 |
| JP | 2004-144204 A | 5/2004 |
| JP | 2006-117074 A | 5/2006 |
| JP | 2010-14147 A | 1/2010 |
| JP | 2011-105038 | 6/2011 |
| JP | 5934291 B2 | 6/2016 |

* cited by examiner

*Primary Examiner* — Joseph D Pape
*Assistant Examiner* — Dana Ivey
(74) *Attorney, Agent, or Firm* — Oblon, McClelland, Maier & Neustadt, L.L.P.

(57) ABSTRACT

A glass support member is provided for fixing a glass plate to a body flange of a vehicle. The glass support member includes a base having a first surface and a second surface that face each other, a column that protrudes from the second surface of the base in a direction away from the base, and an inclined member that is arranged at a tip of the column and extends from the tip of the column toward the second surface of the base at an inclination angle with respect to an axis of the column. The tip of the column is configured to be capable of swaying with respect to the axis of the column within a plane including the axis.

14 Claims, 5 Drawing Sheets

GLASS SUPPORT MEMBER

BACKGROUND OF THE INVENTION

1. Field of the Invention

The present invention generally relates to a glass support member and particularly to a glass support member that is used for fixing a glass plate to a window frame part of a vehicle.

2. Description of the Related Art

Typically, a glass plate is mounted to a window frame part of a front window, a side window, or a rear window of a vehicle such as an automobile, for example. Such a window frame part is usually formed by adjoining the glass plate to a body flange of the vehicle with adhesive. However, because some time is required to cure the adhesive, a member for supporting and fixing the glass plate in place needs to be used to prevent the glass plate from being displaced with respect to the body flange during such curing time.

For example, a support clip is conventionally used as such a fixing member (e.g., Japanese Laid-Open Patent Publication No. 2011-105038). The support clip includes a base to be fixed to the glass plate and a column that projects towards the body flange from the base. Also, the body flange includes a through hole for accommodating the column. Thus, when the glass plate and the body flange are brought close together to face each other, the column of the support clip is inserted into the through hole of the body flange, and in this way, the glass plate may be (temporarily) fixed to the body flange.

As described above, in the process of manufacturing a window frame part of a vehicle, a support clip has typically been used as a member for temporarily fixing the glass plate in place (hereinafter, referred to as "temporary fixing member").

Note that in some cases, a glass plate that is quite large and heavy may be mounted to the window frame part of a vehicle. In the case of supporting such a large glass plate, at least two (usually four or more) temporary fixing members have to be arranged at predetermined positions of the glass plate.

However, in the case of using support clips as temporary fixing members, because the columns of the support clips have to be inserted into corresponding through holes of the body flange, the position of the glass plate with respect to the body flange may be restricted. As the number of support clips having columns inserted into corresponding through holes of the body flange increases, greater restrictions may be imposed on the positioning of the glass plate and the body flange. That is, as the number of the support clips increases, freedom and flexibility in positioning the glass plate with respect to the body flange is restricted. Thus, it may be difficult to insert all the columns of the support clips into their corresponding through holes of the body flange unless the positions of the columns of the support clips and the positions of corresponding through holes of the body flange are properly aligned.

As one measure to address such a problem, the support clips may be used in combination with hook-and-loop fasteners as temporary fixing members. For example, two support clips may be arranged at two locations on a lower side of the glass plate (lower side of window frame part) and corresponding through holes may be formed at two locations of the body flange. In addition, two hook/loop fasteners may be arranged at two locations on an upper side of the glass plate (upper side of window frame part) and corresponding hook/loop fasteners may be arranged at two locations of the body flange.

In such a case, in a first step, the columns of the two support clips may be inserted into the corresponding through holes of the body flange to fix the lower side of the glass plate in place with respect to the body flange, and then, in a second step, the corresponding hook-and-loop fasteners may be fastened to each other to fix the upper side of the glass plate in place with respect to the body flange. In the above case, because the second step involves fastening the hook-and-loop fasteners to each other rather than inserting the columns of the support clips into the corresponding through holes of the body flange as in the case where all of the temporary fixing members constitute support clips, the problem of not being able to insert the columns into the corresponding through holes of the body flange in the second step and thereby not being able to mount the glass plate to the body flange may be avoided, for example.

However, in such a case, the hook/loop fasteners have to be arranged at both the body flange and the glass plate. Thus, the number of components required for manufacturing the window frame part may be increased, and the manufacturing process may become complicated. As a result, production efficiency may decrease and manufacturing costs may increase, for example.

SUMMARY OF THE INVENTION

An aspect of the present invention is directed to providing a glass support member that is capable of supporting and fixing a glass plate in a proper position with respect to a body flange in a simple manner without increasing the number of components required for manufacturing a window frame part.

According to one embodiment of the present invention, a glass support member is provided for fixing a glass plate to a body flange of a vehicle. The glass support member includes a base having a first surface and a second surface that face each other, a column that protrudes from the second surface of the base in a direction away from the base, and an inclined member that is arranged at a tip of the column and extends from the tip of the column toward the second surface of the base at an inclination angle with respect to an axis of the column. The tip of the column is configured to be capable of swaying with respect to the axis of the column within a plane including the axis.

DESCRIPTION OF THE PREFERRED EMBODIMENTS

In the following, an embodiment of the present invention is described.

As described above, in the case of using a combination of support clips and hook-and-loop fasteners as temporary fixing members for supporting and fixing a glass plate to a body flange in manufacturing a window frame part of a vehicle, the hook/loop fasteners have to be arranged at both the body flange and the glass plate. Thus, the number of components required for manufacturing the window frame part is increased, and the manufacturing process tends to become complicated. This may further lead to a decrease in manufacturing efficiency and an increase in production costs.

On the other hand, according to an embodiment of the present invention, a glass support member is provided for fixing a glass plate to a body flange of a vehicle. The glass support member includes a base having a first surface and a second surface that face each other, a column that protrudes from the second surface of the base in a direction away from the base, and an inclined member that is arranged at a tip of the column and extends from the tip of the column toward the second surface of the base at an inclination angle with respect to an axis of the column. The tip of the column is configured to be capable of swaying with respect to the axis of the column within a plane including the axis.

By using such a glass support member in manufacturing a window frame part of a vehicle, for example, when the tip of the glass support member receives an external force by coming into contact with the body flange, the tip of the column of the glass support member may sway with respect to the axis of the column.

Thus, by arranging such a glass support member at a predetermined position of the glass plate and using the glass support member as a temporarily fixing member, the tip of the column of the glass support member may deviate from the axis of the column as necessary. Accordingly, when mounting the glass plate to the body flange via the glass support member, even if the position of the column of the glass support member and the position of a corresponding through hole of the body flange are not in perfect alignment, the tip of the column of the glass support member may be inserted into the through hole of the body flange with relative ease.

Also, when a tip member of the glass support member is inserted into the through hole of the body flange, the tip member engages with the body flange, and in this way, the glass plate may be fixed to the body flange via the glass support member.

Further, the tip member of the glass support member includes a first locking portion for preventing disengagement of the glass plate from the body flange. Thus, once the tip member of the glass support member is inserted into the through hole of the body flange, the engagement between the glass plate and the body flange may be maintained, and the glass support member may be prevented from being disengaged from the through hole of the body flange.

As can be appreciated, by using the glass support member according to an embodiment of the present invention in mounting a glass plate to a body flange, the burden of adjusting the positioning between the column of the glass support member and the through hole of the body flange may be reduced, and the glass plate may be more easily supported and fixed to a proper position with respect to the body flange.

Also, by using the glass support member according to an embodiment of the present invention instead of using a hook-and-loop fastener as a temporary fixing member, problems that are encountered when using the hook-and loop fastener such as an increase in the number of components required in manufacturing the window frame part and the complication of the manufacturing process may be avoided. Also, by using the glass support member according to an embodiment of the present invention, a decrease in the production efficiency of the window frame part and an increase in the production cost may be prevented.

Note that in the present descriptions, a "tip" of the column refers to an end portion of the column opposite the base of the column, and an "apex" of the column refers to the most protruding portion of the tip of the column. A "root portion" of the column refers to a portion including an end portion at the base side of the column and its vicinity.

Also, note that in the present descriptions, the terms "parallel" and "perpendicular" are given certain tolerances to the extent the effects of the present invention would not be impaired.

In the following, specific embodiments of the present invention are described with reference to the accompanying drawings.

(First Embodiment)

A glass support member according to a first embodiment of the present invention (hereinafter referred to as "first glass support member 100") is described below with reference to FIGS. 1-3.

Figure 1:
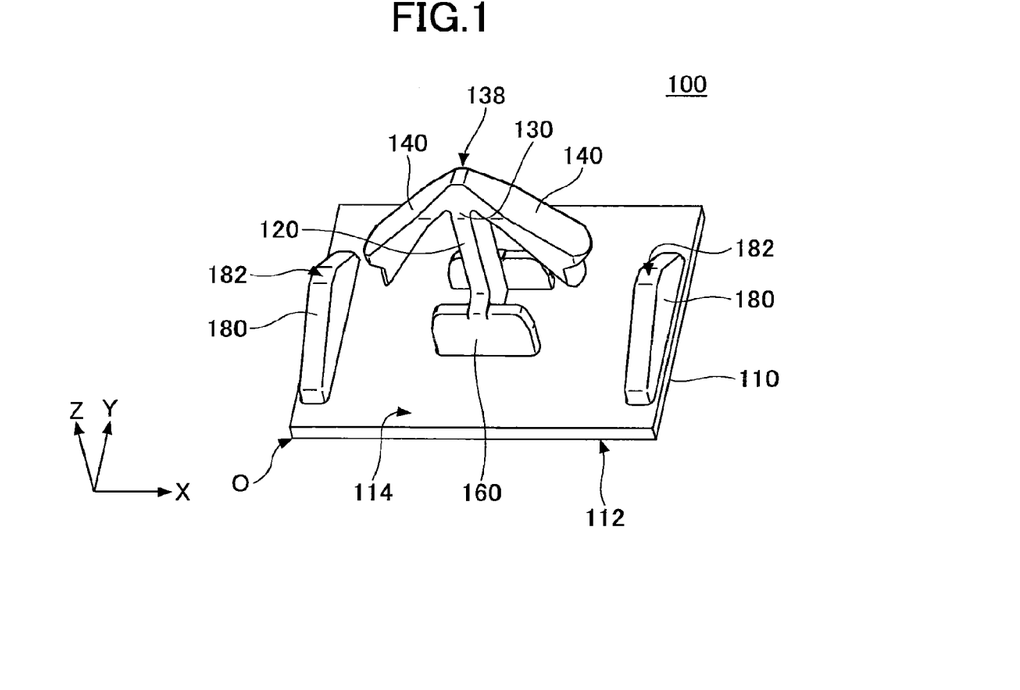
FIG. 1 is a schematic perspective view of a glass support member according to one embodiment of the present invention.

FIG. 1 is a schematic perspective view of the first glass support member 100. FIG. 2 is a schematic cross-sectional view of the first glass support member 100. More specifically, FIG. 2 is a cross-sectional view along a first plane including an axis of a column of the first glass support member 100 (see below). FIG. 3 is a schematic side view of the first glass support member 100 as viewed from the X direction side (see FIG. 1).

Figure 2:
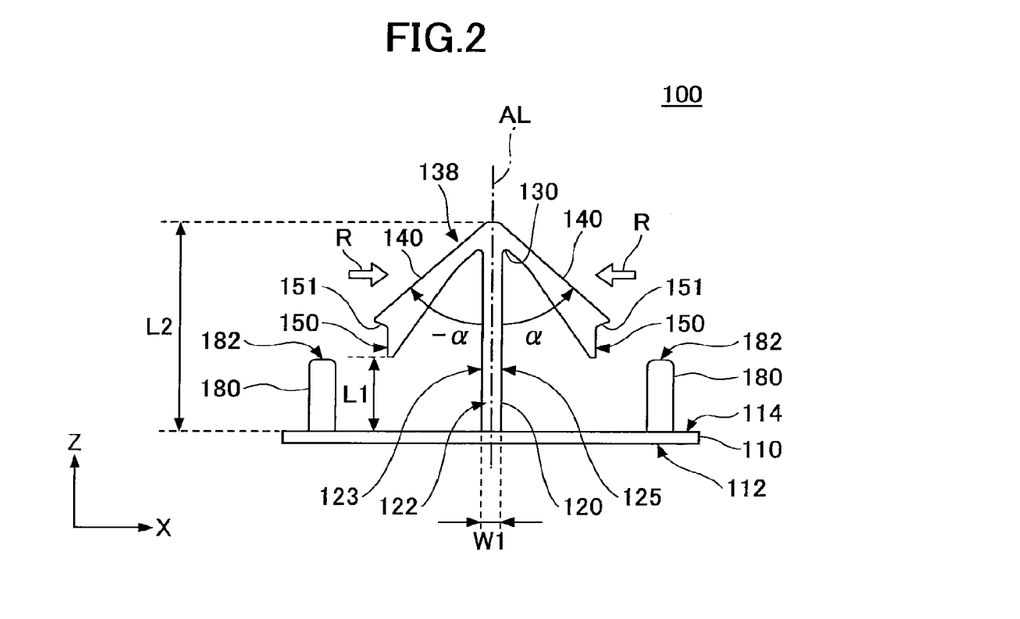
FIG. 2 is cross-sectional view of the glass support member illustrated in FIG. 1.
Figure 3:
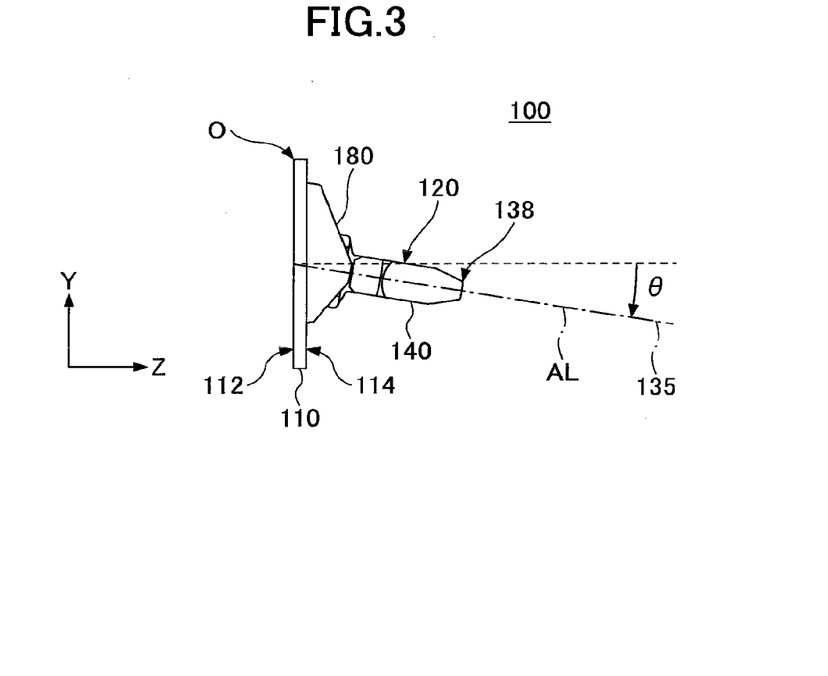
FIG. 3 is a side view of the glass support member illustrated in FIG. 1.

As illustrated in FIGS. 1-3, the first glass support member 100 includes a base 110, a column 120, and a tip member 138. The first glass support member 100 may also include a reinforcing member 160 and/or a second locking portion 180. The base 110 includes a first surface 112 and a second surface 114.

Note that in the present descriptions, the positional relationships of components may be represented using a three-dimensional coordinate system defined by three mutually perpendicular axes (X axis, Y axis and Z-axis). In this case, as illustrated in FIG. 1, it is assumed that the base 110 of the first glass support member 100 is disposed in the XY plane, and an axis perpendicular to the base 110 corresponds to the Z axis. Note that in a case where the base 110 of the glass support member 100 has a curved shape, strictly speaking, "the base 110 is disposed in the XY plane" may not be an accurate description. However, for the sake of simplicity, in the present descriptions, even in such a case, a virtual plane that can be intuitively derived from the curved shape of the base 110 is assumed to be disposed in the XY plane. Note that in the following descriptions, the base 110 that is disposed in the XY plane as well as the base 110 that has a curved shape are described as a plate shaped member disposed in the XY plane. Also, it is assumed that one corner portion of the first surface 112 of the base 110 of the first glass support member 100 corresponds to the origin O of the three axes (see FIGS. 1 and 3).

When using the first glass support member 100 as a temporary fixing member, the first surface 112 of the base 110 is adhered to a glass plate using adhesive or the like. The second surface 114 opposes the first surface 112, and various components of the first glass support member 100 are arranged on the second surface 114. Also, as described above, the base 110 is disposed in the XY plane.

The column 120 protrudes from the second surface 114 of the base 110 in a direction away from the base 110. Note that in the example illustrated in FIGS. 1-3, an axis AL of the column 120 does not have to be parallel to the Z axis but may be inclined with respect to the Z axis by an angle θ (0°<θ<±45°) as illustrated in FIG. 3. However, this is merely an illustrative example, and the axis AL may extend substantially parallel to the Z-axis (i.e., θ=0°), for example. That is, the angle θ is determined according to the orientations of the first glass support member 100 and the body flange when the first glass support member 100 is engaged with the body flange. For example, if the first glass support member 100 is engaged with the body flange in a disposition substantially parallel to the body flange, the angle θ of the axis AL may be close to 0. On the other hand, if the first glass support member 100 is inclined with respect to the body flange upon being mounted to the body flange, the angle θ (absolute value) of the axis AL may be greater. For example, the angle θ may be within a range of +10° to +30° (or −10° to −30°).

Note that the positive/negative sign of the angle θ represents the direction of rotation of the axis AL. In the present descriptions, for the sake of convenience, the angle θ of the axis AL illustrated in FIG. 3 is assumed to be positive.

The column 120 includes a tip 130, and the tip member 138 is arranged at the tip 130. The tip member 138 may be made of the same material as the column 120 and/or be integrally formed with the column 120, for example.

The tip member 138 has a structure that engages with the body flange (i.e., through hole of the body flange) when the tip member 138 is inserted into the through hole of the body flange.

More specifically, as illustrated in FIGS. 1-3, the tip member 138 includes two inclined members 140. Each inclined member 140 has a substantially rectangular shape and has a longitudinal axis that is inclined at an inclination angle α or −α (0°<α<90°) with respect to the axis AL. Each inclined member 140 extends from the tip 130 of the column 120 in a direction toward the second surface 114 of the base 110. The inclination angle α may be within a range of 20° to 50°, for example. Note that the configuration of the inclined member 140 is not particularly limited as long as it includes a portion inclined at an inclination angle within the above range. That is, the inclined member 140 may be any structure that includes a portion spreading outward from the column 120.

Further, the two inclined members 140 are arranged to be mutually symmetrical with respect to the axis AL. For example, in the example illustrated in FIGS. 1-3, assuming a first plane 135 (see FIG. 3) corresponds to a plane that includes the axis AL of the column 120 and does not intersect with the X axis extending from the origin O (plane parallel to the X axis), the two inclined members 140 are arranged to extend symmetrically within the first plane 135.

Also, each inclined member 140 has elasticity and can be elastically deformed. For example, when the two inclined members 140 receive external forces from directions indicated by arrows R illustrated in FIG. 2, the inclined members 140 may elastically deform inward (in a direction toward the column 120). In the present embodiment, each inclined member 140 has a tapered configuration with a portion near the tip 130 of the column 120 arranged to be relatively thin and a portion that gradually becomes thicker toward the second surface 114 of the base 110. With such a configuration, elastic deformation of the inclined member 140 in the inward direction (direction toward the column 120) may be facilitated.

Further, a first locking portion 151 is arranged at a tip 150 of the each of the inclined members 140. The first locking portion 151 prevents disengagement of the tip member 138 from the body flange after the tip member 138 has been inserted into the through hole of the body flange. That is, by arranging the first locking portion 151 at the tip 150 of the inclined member 140, the engagement between the first glass support member 100 and the body flange may be maintained by the first locking portion 151 once the tip member 138 has been inserted into the through hole of the body flange.

By arranging the inclined member 140 to have such a structure, the tip member 138 may be engaged with the body flange (through hole of the body flange) when it is inserted into the through hole of the body flange.

Note that in the first glass support member 100, the tip 130 (tip member 138) of the column 120 is arranged to be elastically deformable when it receives an external force. That is, when the tip 130 of the column 120 receives an external force, the tip 130 is capable of swaying at least within the first plane 135.

Thus, by arranging the first glass support member 100 at a predetermined position of a glass plate and using the first glass support member 100 as a temporarily fixing member, for example, when the tip 130 (tip member 138) of the column 120 of the first glass support member 100 receives an external force upon coming into contact with the body flange, the tip 130 of the column 120 may deviate from the axis AL.

Thus, by using the first glass support member 100 in mounting a glass plate to the body flange, even if the position of the column 120 of the first glass support member 100 and the position of the through hole of the body flange are not in perfect alignment with each other, the tip 130 of the column 120 of the glass support member 100 may be inserted into the through hole of the body flange with relative ease.

Also, as described above, the tip member 138 of the first glass support member 100 includes two inclined members 140, and the first locking portion 151 is arranged at the tip 150 of each of the inclined members 140. Thus, once the tip member 138 of the first glass support member 100 is inserted into the through hole of the body flange, the engagement between the tip member 138 and the body flange may be maintained thereafter, and the first glass support member 100 may be effectively prevented from being disengaged from the through hole of the body flange.

In this way, when mounting a glass plate to the body flange, the burden of adjusting the positioning between the column 12 of the first glass support member 100 and the through hole of the body flange may be reduced, and the glass plate may be more easily supported and fixed to a proper position with respect to the body flange.

Also, by using the first glass support member 100 as a temporary fixing member, the need to use hook-and-loop fasteners may be eliminated such that an increase in the number of components required for manufacturing a window frame part and complication of the manufacturing process may be avoided. Also, as a result, manufacturing efficiency for manufacturing the window frame part may be improved, and an increase in manufacturing costs may be prevented, for example.

Note that the configuration of the first glass support member 100 illustrated in FIGS. 1-3 is merely one illustrative example, and the first glass support member 100 may have other configurations. For example, the configuration of the tip member 138 of the first glass support member 100 is not particularly limited as long as it can be inserted into the through hole of the body flange to be engaged with the body flange. Further, the configuration of the first locking portion 151 is not particularly limited so long as it is configured to prevent disengagement of the tip member 138 from the body flange after the tip member 138 is inserted into the through hole of the body flange.

Similarly, the configuration of the column 120 is not particularly limited as long as the tip 130 is capable of swaying within at least one plane including the axis AL (not limited to the first plane 135). For example, the tip 130 of the column 120 may be configured to oscillate in opposite directions with respect to the axis AL within the first plane 135 including the axis AL. Note that various other configurations may be conceived as well.

(Individual Components)

In the following, the individual components of the first glass support member 100 as illustrated in FIGS. 1-3 are described in greater detail. Note that in the following, reference numerals indicated in FIGS. 1-3 are used to describe components of a glass support member according to an embodiment of the present invention. However, the present invention is not limited to the embodiment illustrated in FIGS. 1-3.

(Base 110)

As described above, the base 110 includes the first surface 112 that is to be adhered to a glass plate and the second surface 114 on which various components are arranged.

The material of the base 110 is not particularly limited. For example, the base 110 may be made of resin.

The first surface 112 and/or the second surface 114 may be in various shapes such as a rectangle, a square, a circle, or an elliptical shape, for example.

The dimensions of the first surface 112 and/or the second surface 114 are not particularly limited. For example, in a case where the first surface 112 and/or the second surface 114 is arranged into a rectangular shape, the short side of the rectangle may be within a range of 7.5 mm to 31 mm, and the long side of the rectangle may be within a range of 22 mm to 60 mm.

Also, the form of the base 110 is not particularly limited. For example, the first surface 112 of the base 110 may be a flat surface or a curved surface. Note that a suitable form for the first surface 112 may be selected according to the shape of the glass plate to which the first glass support member 100 is to be attached, for example.

(Column 120)

The configuration of the column 120 is not particularly limited as long as its tip 130 is capable of swaying at least within one plane including the axis AL (e.g., the first plane 135).

For example, in the first glass support member 100 illustrated in FIGS. 1-3, the column 120 has a substantially rectangular cuboid shape having four side faces that are parallel to the axis AL. Note that of the four side faces of the column 120, the side faces that are parallel to the first plane 135 are referred to as "first side face 122" and "third side face 124", and the side faces that are perpendicular to the first plane 135 are referred to as "second side face 123" and "fourth side face 125" (see FIG. 2; note, however, that the third side face 124 is not shown in FIG. 2).

Note that the width W1 of the first side face 122 and the third side face 124 is arranged to be less than the width W2 of the second side face 123 and the fourth side face 125. For example, the width W2 may be within a range of 2 mm to 10 mm, whereas the width W1 may be within a range of 1 mm to 5 mm. In particular, in terms of achieving both desired strength of the column 120 and swaying characteristics of the tip 130 of the column 120, the ratio W1:W2 is preferably between 1:2 and 1:5.

In this case, owing to the rigidity difference in the column 120 created by the difference between the width W1 of the first side face 122 and the third side face 124 and the width W2 of the second side face 123 and the fourth side face 125, when the tip 130 of the column 120 receives an external force, the column 120 (tip 130) may sway in directions parallel to the first side face 122 and the third side face 124; namely, the tip 130 of the column 120 may oscillate within the first plane 135.

In another embodiment, the width W1 of the first side face 122 and the third side face 124 may be arranged to be greater than the width W2 of the second side face 123 and the fourth side face 125, and in such case, the column 120 (tip 130) may sway in directions parallel to the second side face 123 and the fourth side face 125; namely, the tip 130 of the column 120 may oscillate within a second plane that is perpendicular to the first plane 135.

Note, however, that the structure of the column of a glass support member according to an embodiment of the present invention is not limited to such a rectangular cuboid shape. For example, a cylindrical column having a relatively small diameter (e.g., diameter of 1.0 mm to 5.0 mm) may be used. In this case, the tip of the column may deviate within all planes including the axis AL (all planes including the axis AL formed 360 degrees around the axis AL), or the tip of the column may oscillate about the axis AL in all directions. However, when the diameter of the cylinder is too small (e.g., less than 1.0 mm), the column may become susceptible to damage.

In another embodiment, a rigidity difference may be created between a tip portion (portion toward the tip member 138) and a root portion (portion toward the base 110) of the column. For example, a material having greater elasticity may be used at the tip portion of the column, and a material having less elasticity may be used at the root portion of the column. In this way, when the tip of the column receives an external force, the tip portion of the column may be selectively swayed within at least one plane including the axis AL while the root portion of the column may remain substantially stable.

Further, the thickness (cross-sectional area) of the column may be arranged to vary along the axis AL. For example, the column may be arranged to have a tapered configuration with the root side of the column having a larger cross-sectional area than the tip side of the column. In this way, when the tip of the column receives an external force, the tip of the column may be selectively swayed within at least one plane including the axis AL.

Note that the column may have other various configurations. That is, the column may have any configuration as long as it is capable of swaying within at least one plane including the axis AL.

Note that in the present descriptions, a plane including the axis AL refers to a plane including substantially the entire axis AL. Also, in the present descriptions, the tip 130 of the column 120 swaying with respect to the axis AL refers to the tip 130 of the column 120 deviating from the axis AL in response to an external force, and may also be referred to as the tip of the column being decentered with respect to the axis AL.

(Reinforcing Member 160)

The first glass support member 100 may further include the reinforcing member 160. The reinforcing member 160 is arranged on the base 110 adjacent to the root portion of the column 120 (opposite side of the tip 130).

By arranging such a reinforcing member 160, the elasticity of the column 120 at a portion toward the base 110 may be reduced. That is, by arranging the reinforcing member 160, the swaying of the column 120 may be restricted to a portion at the tip 130 and its vicinity, and deformation of the entire column 120 may be prevented. Thus, by arranging the reinforcing member 160, the column 120 may be effectively prevented from being damaged when the first glass support member 100 is used.

Note that the form of the reinforcing member 160 is not particularly limited as long as it is capable of enhancing the rigidity of the root portion of the column 120 and preventing the entire column 120 from being deformed. For example, the reinforcing member 160 may have a rectangular shape as illustrated in FIG. 1. Also, the reinforcing member 160 may be integrally formed with the base 110 and/or the column 120, for example.

Note that in the first glass support member 100, the reinforcing member 160 is not an essential element and may be omitted in some embodiments.

(Tip Member 138/First Locking Portion 151)

The tip member 138 engages with the body flange when it is inserted into the through hole of the body flange.

For example, in the example of FIGS. 1-3, the tip member 138 has two inclined members 140, and the first locking portion 151 is arranged at the tip 150 of each of the inclined members 140.

In the example of FIGS. 1-3, each inclined member 140 extends from the tip 130 of the column 120 towards the second surface 114 of the base 110 at a predetermined inclination angle ($\alpha$ or $-\alpha$). Also, the two inclined members 140 are arranged to extend symmetrically with respect to the axis AL within the first plane 135. However, the above configuration is merely an illustrative example, and the two inclined members 140 may be disposed at the tip 130 of the column 120 in other various ways. For example, the two inclined members 140 may be arranged to extend symmetrically with respect to the axis AL within a second plane that is perpendicular to the first plane 135. In other examples, the two inclined members 140 may not be arranged symmetrically with respect to the axis AL. That is, the two inclined members 140 do not necessarily have to be arranged to extend within one plane including the axis AL. Also, the two inclined members 140 do not necessarily have to be symmetrical with respect to the axis AL.

Also, the tip member 138 does not necessarily have to extend from the apex of the column 120 as long as it extends from the tip side of the column 120.

Also, the tip member 138 may have a configuration other than the configuration illustrated in FIGS. 1-3. For example, the tip member 138 may only have one inclined member 140, or may have three or more inclined members 140. Note that a configuration including only one inclined member is described in detail below.

Note that the tip member 138 preferably has elasticity such that it may be elastically deformed upon receiving an external force. In this case, even if the position of the tip member 138 of the glass support member 100 is not exactly aligned with the position of the through hole of the body flange, the tip member 138 may be deformed when it comes into contact with the body flange, and the tip member 138 may thus be inserted into the through hole of the body flange.

Also, in the case where the tip member 138 has elasticity, when the tip member 138 is inserted into the through hole of the body flange, the tip member 138 may be contracted and reduced in size in the X axis direction as indicated by the arrows R in FIG. 2, for example. In this way, the tip member 138 may easily pass through the through hole of the body flange, and once the tip member 138 passes through the through hole, the size of the tip member 138 may be restored to thereby facilitate engagement of the tip member 138 with the through hole of the body flange.

As illustrated in FIG. 2, provided that length L1 denotes a distance between the base 110 and a position of the tip member 138 closest to the base 110 (i.e., the tip 150 of the inclined member 140), and length L2 denotes a distance between the base 110 and a position of the tip member 138 farthest from the base 110 (i.e., other end of the inclined member 140 opposite the base portion 110), the length L1 is preferably at least 5% of the length L2. In this way, when the tip 130 of the column 120 is swayed, the swaying movement of the tip 130 may be prevented from being compromised by the tip member 138. That is, by arranging the length L1 to be adequately long, movement of the tip member 138 may not be restricted by the base 110, and the deviation movement of the tip 130 of the column 120 may be prevented from being confined due to such a restriction. Note that the length L1 may preferably be at least 10% of the length L2, more preferably at least 20% of the length L2, and more preferably at least 30% of the length L2.

Note that the length L1 and the length L2 represent the shortest distances to the base 110 from their respective positions of the tip member 138.

In the example of FIGS. 1-3, the first locking portion 151 is arranged at the tip 150 of each of the inclined members 140. However, the arrangement and configuration of the first locking portion 151 are not particularly limited. That is, the first locking portion 151 may be arranged at any location of the tip member 138 in any configuration as long as it is capable of preventing disengagement of the tip member 138 from the body flange after the tip member 138 is inserted into the through hole of the body flange. Also, in some embodiments where the tip 150 of the inclined member 140 is capable of engaging with the body flange and properly supporting the glass plate without the locking portion 151, the first locking portion 151 may be omitted, for example. That is, the first locking portion 151 may not be an essential element in such case.

(Second Locking Portion 180)

The first glass support member 100 may further include the second locking portion 180.

The second locking portion 180 is configured to stably support a glass plate via the glass support member 100 and prevent rattling of the glass plate with respect to the body flange after the column 120 of the glass support member 100 has been inserted into the through hole of the body flange and the glass plate has been mounted to the body flange.

The second locking portion 180 may have any configuration as long as it is able to prevent such rattling of the glass plate.

For example, as illustrated in FIGS. 1-3, the second locking portion 180 may be configured to have an upper end 182 that protrudes upward. After the column 120 of the glass support member 100 is inserted into the through hole of the body flange, the upper end 182 faces the body flange. At this point, the second locking portion 180 facing the body flange may be in contact with the body flange or may be separated from the body flange by a gap of several millimeters, for example. In this way, rattle between the glass plate and the body flange may be reduced and the glass plate may be stably supported and fixed to the body flange.

Note that by providing a gap of several millimeters between the second locking portion 180 and the body flange, the tip member 138 may be easily inserted through the through hole of the body flange and rattle between the glass plate and the body flange may be reduced.

The upper end 182 of the second locking portion 180 may have a substantially flat surface or a substantially pointed tip, for example.

Also, note that in the first glass support member 100, the second locking portion 180 is not an essential element and may be omitted in some embodiments.

(Second Embodiment)

In the following, a glass support member according to a second embodiment of the present invention (hereinafter referred to as "second glass support member 200") is described with reference to FIGS. 4 and 5.

Figure 4:
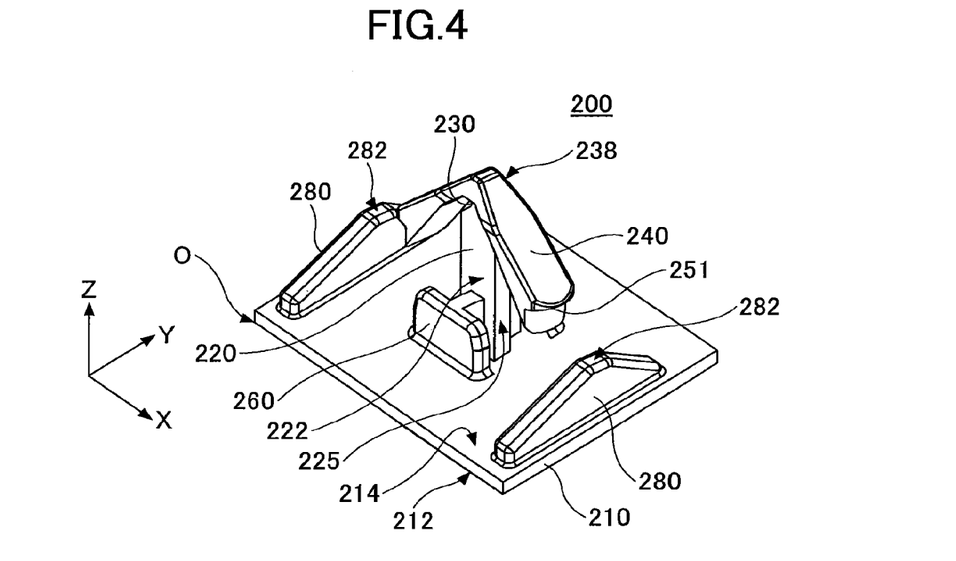
FIG. 4 is a schematic perspective view of a glass support member according to another embodiment of the present invention.

FIG. 4 is a schematic perspective view of the second glass support member 200. FIG. 5 is a schematic cross-sectional view of the second glass support member 200. Note that FIG. 5 is a cross-sectional view along a first plane 235 of the second glass support member 200 (see below).

As illustrated in FIG. 4, the second glass support member 200 has a configuration similar to that of the first glass support member 100 as described above. In FIGS. 4 and 5, components corresponding to those illustrated in FIGS. 1-3 are given reference numerals obtained by adding 100 to the corresponding reference numerals used in FIGS. 1 to 3. For example, the second glass support member 200 includes a base 210, a column 220, a tip member 238, a reinforcing member 260, and a second locking portion 280 that correspond to the base 110, the column 120, the tip member 138, the reinforcing member 160, and the second locking portion 180 of the first glass support member 100.

However, in the second glass support member 200, the configurations of the column 220 and the tip member 238 substantially differ from those of the column 120 and the tip member 138 of the first glass support member 100.

More specifically, in the second glass support member 200, the column 220 protrudes from the second surface 214 of the base 210 in a direction away from the base 210 and has a substantially rectangular cuboid shape. Also, assuming a first plane 235 corresponds to a plane that does not intersect with the X axis extending from the origin O (plane parallel to the X axis), the column 220 includes an axis AL and a tip 230 that is capable of swaying within a second plane 236 that is substantially perpendicular to the first plane 235. Note that the second plane 236 coincides with the axis AL in FIG. 5.

Figure 5:
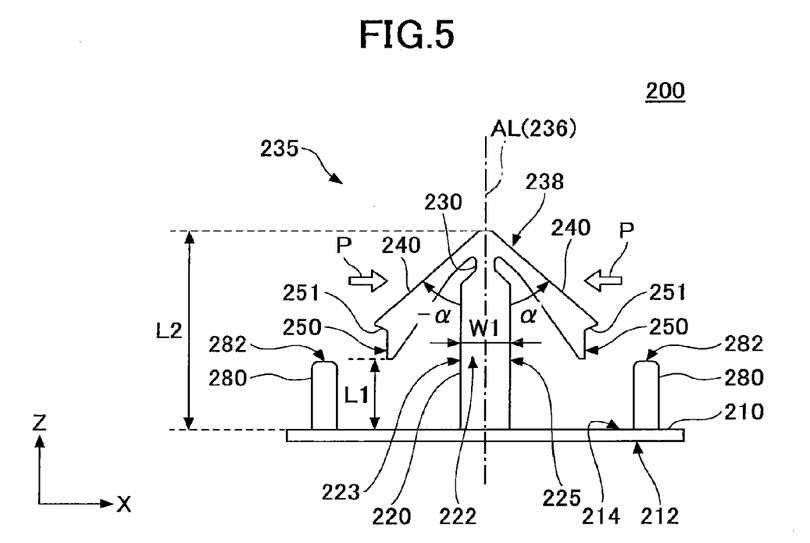
FIG. 5 is a cross-sectional view of the glass support member illustrated in FIG. 4.

The rectangular cuboid column 220 has four side faces including a first side face 222 and an opposing third side 224 that are parallel to the first plane 235, and a second side face 223 and an opposing fourth side face 225 that are parallel to the second plane 236 (see FIG. 5; however, the third side face 224 is not shown in FIG. 5). The width W1 of the first side face 222 and the third side face 224 is arranged to be greater than the width W2 of the second side face 223 and the fourth side face 225.

In this case, owing to the rigidity difference created by the difference between the width W1 of the first side face 222/third side face 224 and the width W2 of the second side face 223/fourth side face 225, the tip 230 of the column 220 is capable of swaying within the second plane 236.

Also, in the second glass support member 200, the tip member 238 that is arranged at the tip 230 of the column 220 includes two inclined members 240. Each inclined member 240 has a substantially rectangular shape, and the longitudinal axes of the inclined members 214 are arranged to extend toward the base 200 at an inclination angle of α or −α(0°<α<90°) with respect to the axis AL. The inclined members 240 are arranged to extend symmetrically with respect to the axis AL within the first plane 235.

The inclined members 240 have elasticity such that they can be elastically deformed. That is, upon receiving external forces from directions indicated by arrows P illustrated in FIG. 5, for example, the two inclined members 240 may be elastically deformed inward (direction toward the column 220).

As in the first embodiment, in the second embodiment, the length L1 as illustrated in FIG. 5 is preferably at least 5% of the length L2. Thus, when the tip 230 of the column 220 is swayed, the swaying movement of the tip 230 may be less likely to be compromised by the tip member 238. That is, in this way, movement of the tip member 238 may not be restricted by the base 210, and the deviating movement of the tip 230 of the column 220 may thus be prevented from being confined due to such restriction. Note that the length L1 may preferably be at least 10% of the length L2, more preferably at least 20% of the length L2, and more preferably at least 30% of the length L2.

It may be apparent to those skilled in the art that advantageous effects similar to those achieved by the first glass support member 100 may also be achieved by the second glass support member 200 including the column 220 and the tip member 238 having the above-described configurations. Namely, by arranging the second glass support member 200 at a predetermined position of a glass sheet and using the second glass support member 200 as a temporarily fixing member, for example, when the tip member 238 of the second glass support member 200 receives an external force by coming into contact with the body flange, the tip 230 of the column 220 may deviate from the axis AL.

The tip member 238 of the second glass support member 200 includes two inclined members 240, and a first locking portion 251 is arranged at a tip 250 of each of the inclined members 240. In this way, when the tip member 238 of the second glass support member 200 is inserted into the through hole of the body flange, the tip member 238 may be engaged with the body flange.

Thus, by using the second glass support member 200 in mounting a glass plate to the body flange, even if the position of the column 220 of the second glass support member 200 and the position of the through hole of the body flange are not in perfect alignment with each other, the tip 230 of the column 220 of the second glass support member 200 may be inserted into the through hole of the body flange with relative ease, for example.

Also, note that as in the first glass support member 100, in the second glass support member 200, the reinforcing member 260, the first locking portion 251, and the second locking portion 280 are not essential elements and may be omitted in some embodiments.

(Third Embodiment)

In the following, a glass support member according to a third embodiment of the present invention (hereinafter referred to as "third glass support member 300") is described with reference to FIGS. 6 and 7.

Figure 6:
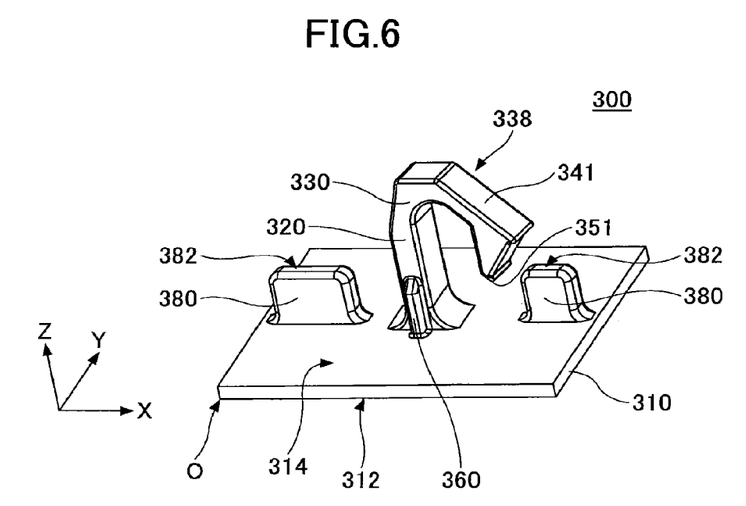
FIG. 6 is a schematic perspective view of a glass support member according to another embodiment of the present invention.

FIG. 6 is a schematic perspective view of the third glass support member 300. FIG. 7 is a schematic side view of the third glass support member 300.

Figure 7:
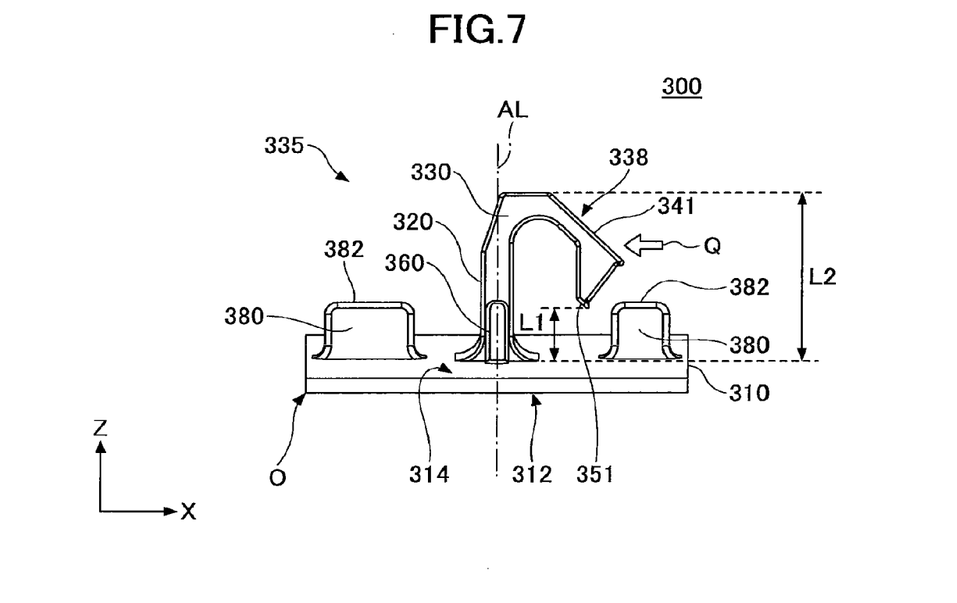
FIG. 7 is a side view of the glass support member illustrated in FIG. 6.

As illustrated in FIGS. 6 and 7, the third glass support member 300 has a configuration similar to that of the first glass support member 100 as described above. Thus, in FIGS. 6 and 7, components corresponding to those of the first glass support member 100 are given reference numerals obtained by adding 200 to the corresponding reference numerals used in FIGS. 1-3. For example, the third glass support member 300 includes a base 310, a column 320, a tip member 338, a reinforcing member 360, and a second locking portion 380 that correspond to the base 110, the column 120, the tip member 138, the reinforcing member 160, and the second locking portion 180 of the first glass support member 100.

However, in the third glass support member 300, the configuration of the tip member 338 differs from that of the tip member 138 of the first glass support member 100.

More specifically, in the third glass support member 300, the tip member 338, which is arranged at the tip 330 of the column 320, includes one single inclined member 341. Also, a first locking portion 351 is arranged at the tip of the inclined member 341.

The inclined member 341 has elasticity such that it can be elastically deformed. That is, when the inclined member 341 receives an external force from a direction indicated by arrow Q illustrated in FIG. 7, for example, the inclined member 341 can be elastically deformed inward (direction toward the column 320).

In the third glass support member 300, the column 320 has a substantially rectangular cuboid shape extending along the axis AL. Also, assuming a first plane 335 corresponds to a plane that does not intersect with the X axis extending from the origin O (plane parallel to the X axis), the column 320 includes an axis AL and a tip 330 that is capable of swaying within the first plane 335.

It will be apparent to those skilled in the art that advantageous effects similar to those achieved by the first glass support member 100 may also be achieved by the third glass support member 300 having the tip member 338 with the above-described configuration. That is, by arranging the third glass support member 300 at a predetermined position of the glass sheet and using the third glass support member 300 as a temporarily fixing member, for example, when the tip member 338 of the third glass support member 300 receives an external force by coming into contact with the body flange, the column 320 may deviate with respect to the axis AL.

Also, the tip member 338 of the third glass support member 300 includes the inclined member 341, and the first locking portion 351 is arranged at the tip of the inclined member 341. Thus, once the tip member 338 of the third glass support member 300 is inserted into the through hole of the body flange, the engagement between the tip member 338 and the body flange may be maintained thereafter, and the third glass support member 300 may be effectively prevented from being disengaged from the through hole of the body flange.

Thus, by using the third glass support member 300 in mounting the glass plate to the body flange, even if the position of the column 320 of the third glass support member 300 and the position of the through hole of the body flange are not in perfect alignment with each other, the tip 330 of the column 320 of the glass support member 300 may be inserted into the through hole of the body flange with relative ease, for example.

Note, also, that in the third glass support member 300, the reinforcing member 360, the first locking portion 351, and the second locking portion 380 are not essential components and may be omitted in some embodiments.

(Glass Support Member Usage)

In the following, an exemplary usage of a glass support member according to an embodiment of the present invention is described with reference to FIGS. 8 and 9. Note that in the following, the first glass support member 100 as illustrated in FIGS. 1-3 is used as an example to illustrate usage of a glass support member according to an embodiment of the present invention.

Figure 8:
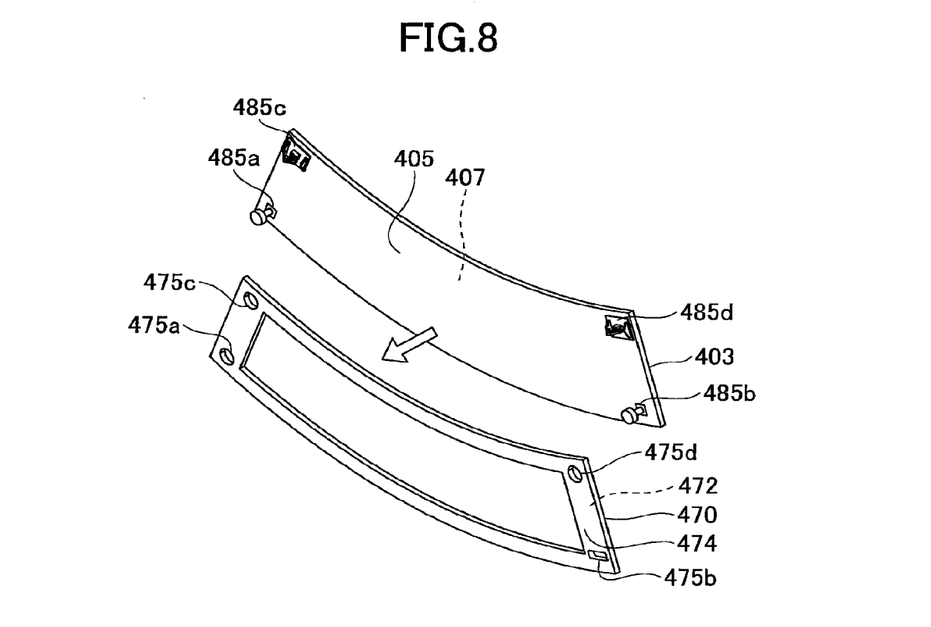
FIG. 8 schematically illustrates a process of mounting the glass plate to a body flange using temporary fixing members in manufacturing an assembly.

FIG. 8 schematically illustrates a process of mounting a glass plate to a body flange using temporary fixing members when manufacturing an assembly. FIG. 9 is a schematic cross-sectional view of a part of the assembly at a position of one of the temporary fixing members.

As illustrated in FIG. 8, for example, in the case of manufacturing a window frame part of a vehicle such as an automobile, first, a glass plate 403 to be mounted to a body flange 470 of the vehicle is prepared.

The body flange 470 includes a first surface 472 and second surface 474. The glass plate 403 includes a first surface 405 and second surface 407.

Note that in the actual manufacturing process of the window frame part, adhesive is applied around the first surface 405 of the glass plate 403 and/or the first surface 472 of the body flange 470. However, in FIGS. 8 and 9, the adhesive is omitted from the illustrations for the sake of clarity.

A first through hole 475a, a second through hole 475b, a third through hole 475c, and a fourth through hole 475d that penetrate through the body flange 470 from the first surface 472 to the second surface 474 are formed at four corner positions of the body flange 470. A first temporary fixing member 485a, a second temporary fixing member 485b, a third temporary fixing member 485c, and a fourth temporary fixing member 485d are arranged at four corner positions of the first surface 405 of the glass plate 403. The first through fourth temporarily fixing members 485a-485d are arranged at positions corresponding to the positions of the first through fourth through holes 475a-475d formed at the body flange 470.

Note that in the present example, it is assumed that of the first through fourth temporary fixing members 485a-485d, the third temporary fixing member 485c and the fourth temporary fixing member 485d that are arranged at the upper side of the glass plate 403 correspond to the first glass support members 100 as described above. Also, it assumed that conventional support clips (with columns that do not have tips that deviate with respect to its axis) are used as the remaining first and second temporary fixing members 485a and 485b that are arranged at the lower side of the glass plate 403.

In the present example, the third temporary fixing member 485c and the fourth temporary fixing member 485d arranged at the upper side may be mounted to predetermined positions of the first surface 405 of the glass plate 403 by adhering the first surface 114 of the base 110 of the glass support member 100 to the first surface 405 of the glass plate 403.

Then, the glass plate 403 may be positioned with respect to the body flange 470 by having the first surface 405 of the glass plate 403 face the first surface 472 of the body flange 470.

Figure 9:
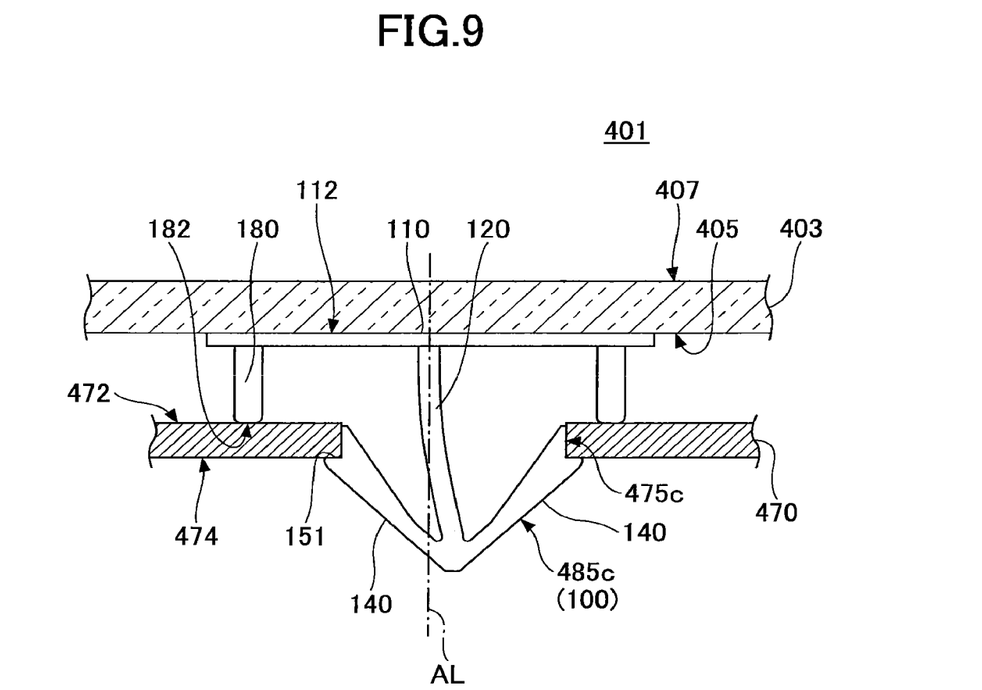
FIG. 9 is a cross-sectional view of a part of the assembly at the position of one of the temporary fixing members.

Then, the glass plate 403 may be mounted to the body flange 470 to manufacture an assembly 401 as illustrated in FIG. 9.

When manufacturing the assembly 401 from the state as illustrated in FIG. 8, as a first step, the column of one of the temporary fixing members arranged at the lower side of the glass plate 403 (e.g., first temporary fixing member 485a) may be inserted into the corresponding through hole of the body flange 470 (e.g., first through hole 475a). In this way, the glass plate 403 may be temporarily fixed to the body flange 470 at this position.

Next, as a second step, the column of the remaining temporary fixing member arranged at the lower side of the glass plate 403 (e.g., second temporary fixing member 485b) may be inserted into the corresponding through hole of the body flange 470 (e.g., second through hole 475b). In this way, the glass plate 403 may be temporarily fixed to the body flange 470 at this position. Thus, the lower side of the glass plate 403 may be supported and fixed in place with respect to the body flange 470.

Note that in order to facilitate the above procedures, the second through hole 475b of the body flange 470 may be arranged into a long hole (hole having a longer horizontal dimension than a vertical dimension) as illustrated in FIG. 8. In this way, some accommodation may be made for positional deviations in the horizontal direction between the second temporary fixing member 485b and the second through hole 475b. That is, even if the center of the column of the second temporary fixing member 485b is slightly shifted in the horizontal direction with respect to the center of the second through hole 475b, the column of the second temporary fixing member 485b may still be inserted into the second through hole 475b.

Next, as a third step, one of the temporary fixing members arranged at the upper side of the glass plate 403 (e.g., third temporary fixing member 485c), that is, the tip member 138 of the first glass support member 100 may be inserted into the corresponding through hole of the body flange 470 (e.g., third through-hole 475c). In this way, the glass plate 403 may be temporarily fixed to the body flange 470 at this position.

As described above, the tip 130 of the column 120 of the first glass support member 100 is capable of deviating from the axis AL upon receiving an external force.

Thus, in this step, even if the center position of the column 120 of the first glass support member 100 and the center position of the third through hole 475c of the body flange 470 are not exactly aligned with each other, the tip 130 of the column 120 may be inserted into the third through hole 475c of the body flange 470 with relative ease.

Further, as described above, the tip member 138 of the first glass support member 100 includes two inclined members 140, and the first locking portion 151 is arranged at the tip 150 of each of the inclined members 140. Thus, once the tip member 138 of the first glass support member 100 is inserted into the third through hole 475c of the body flange 470, the engagement between the tip member 138 and the body flange 470 may be maintained thereafter, and the first glass support member 100 may be effectively prevented from being disengaged from the third through hole 475c of the body flange 470.

Further, the tip member 138 of the first glass support member 100 may be elastically deformable in the directions indicated by the arrows R illustrated in FIG. 2. In this way, even if the position of the tip member 138 of the glass support member 100 is not exactly aligned with the position of the third through hole 485c of the body flange 470, the tip member 138 may be deformed when the tip member 138 comes into contact with the body flange 470, and the tip member 138 may thus be inserted into the third through hole 485c of the body flange 470. Also, once the tip member 138 passes through the third through-hole 485c, the shape and size of the tip member 138 is restored, and in this way engagement of the tip member 138 with the third through-hole 485c of the body flange 470 may be facilitated.

In this way, engagement between the third temporary fixing member 485c and the body flange 470 as illustrated in FIG. 9 may be achieved with relative ease.

Note that after the third step, the first locking portions 151 of the inclined members 140 may be in contact with the second surface 474 and the third through hole 475c of the body flange 470, as illustrated in FIG. 9, and in this way, the first glass support member 100 may be engaged with the body flange 470.

Also, in the case where the first glass support member 100 includes the second locking portion 180, the upper end 182 of the second locking portion 180 facing the body flange 470 may be in contact with the first surface 472 of the body flange 470, or the upper end 182 may be spaced apart from the first surface 472 by a gap of several millimeters. In this way, rattling of the glass plate 403 with respect to the body flange 470 may be prevented.

Next, as a fourth step, the remaining temporary fixing member arranged at the upper side of the glass plate 403 (e.g., fourth temporary fixing member 485d), that is, the tip member 138 of the first glass support member 100 may be inserted into the corresponding through hole of the body flange 470 (e.g., fourth through hole 475d).

As with the third step, in the fourth step, even if the center position of the column 120 of the first glass support member 100 and the center position of the fourth through hole 475d of the body flange 470 are not exactly aligned with each other, the tip 130 of the column 120 may be inserted into the fourth through hole 475d of the body flange 470 with relative ease.

Also, once the tip member 138 of the first glass support member 100 is inserted into the fourth through hole 475d of the body flange 470, the engagement between the tip member 138 and the body flange 470 may be maintained thereafter, and the first glass support member 100 may effectively be prevented from being disengaged from the fourth through hole 475d of the body flange 470.

Further, in the case where the tip member 138 of the first glass support member 100 is elastically deformable, even if the position of the tip member 138 of the glass support member 100 is not exactly aligned with the position of the four through holes 485d of the body flange 470, the tip member 138 may be deformed upon coming into contact with the body flange 470 such that the tip member 138 may be inserted into the fourth through hole 485d of the body flange 470. Also, once the tip member 138 passes through the fourth through hole 485d, the shape and size of the tip member 138 may be restored, and in this way, engagement of the tip member 138 with the fourth through hole 485d of the body flange 470 may be facilitated.

Note that when carrying out the fourth step, the glass plate 403 is already fixed to the body flange 470 via the first through third temporary fixing members 485a-485c at three corner positions. Thus, a positional deviation between the fourth temporary fixing member 485d and the fourth through hole 475d may be relatively large, and as such, it may be rather difficult to adequately accommodate such positional deviation in the case of manufacturing the assembly 401 using a convention method.

However, by using the first glass support member 100 as the fourth temporary fixing member 485d, engagement between the fourth temporal fixing member 485d and the fourth through hole 475d of the body flange 470 as illustrated in FIG. 9 may be achieved with relative ease.

After the fourth step, the glass plate 403 may be properly supported and fixed to the body flange 470, and the assembly 401 having the glass plate 403 properly mounted at a predetermined position of the body flange 470 may be obtained.

Note that the above described usage of the glass support member is merely an illustrative example, and other various usage modes may be contemplated.

For example, in the example illustrated in FIGS. 8 and 9, the third and fourth temporary fixing members 485c and 485d of the four temporary fixing members 485a-485d correspond to the first glass support member 100. However, in other examples, only one of the four temporary fixing members 485a-485d that is the last temporary fixing member to be engaged with the corresponding through hole of the body flange 470 may correspond to the first glass support member 100. Alternatively, all four of the temporary fixing members 485a-485d may correspond to the first glass support member 100, for example.

Also, instead of using the first glass support member 100, the second glass support member 200 or the third glass support member 300 may be used as one or more of the temporary fixing members 485a-485d.

Further, the shapes of the through holes 475a-475d formed in the body flange 470 are not particularly limited. For example, the shapes of the through holes 475a-475d may be circular, oval, square, rectangular, or any other shape.

Further, the present invention is not limited to the specific embodiments described above, and various variations and modifications may be made without departing from the scope of the present invention.

INDUSTRIAL APPLICABILITY

The present invention may be applied to a glass support member that is used when fixing a glass plate to a window frame part of a vehicle, for example.

The present application is based on and claims the benefit of priority to Japanese Patent Application No. 2014-246173 filed on Dec. 4, 2014, the entire contents of which are hereby incorporated by reference.

What is claimed is:

1. A glass support member for fixing a glass plate to a body flange of a vehicle, the glass support member comprising:
    a base including a first surface and a second surface;
    a column that protrudes from the second surface of the base in a direction away from the base; and
    an inclined member that is arranged at a tip of the column;
    wherein the column includes a first side face, a second side face, a third side face, and a fourth side face that are substantially parallel to an axis of the column, the first side face opposing the third side face, and the second side face opposing the fourth side face;
    wherein a ratio of a width W1 of the first side face and the third side face to a width W2 of the second side face and the fourth side face is between 1:2 and 1:5;
    wherein the inclined member has a substantially rectangular shape and extends from the tip of the column toward the second surface of the base at an inclination angle with respect to the axis of the column; and
    wherein the tip of the column deviates from the axis of the column upon receiving an external force.

2. The glass support member according to claim 1, wherein the column has a substantially rectangular cuboid shape.

3. The glass support member according to claim 1, wherein the width of the first side face is within a range of 1 mm to 5 mm.

4. The glass support member according to claim 1, wherein the inclined member has elasticity.

5. The glass support member according to claim 1, further comprising:
    two inclined members that extend from the tip of the column and are arranged symmetrically with respect to the axis.

6. The glass support member according to claim 5, wherein
    the tip of the column deviates from the axis within a first plane including the axis upon receiving an external force; and
    the two inclined members extend within the first plane.

7. The glass support member according to claim 5, wherein
    the tip of the column deviates from the axis within a first plane including the axis upon receiving an external force; and
    the two inclined members extend within a second plane including the axis, the second plane being substantially perpendicular to the first plane.

8. The glass support member according to claim 1, wherein the inclined member includes a first locking portion configured to be engaged with the body flange.

9. The glass support member according to claim 1, wherein
    L1 is greater than or equal to 5% of L2;
    provided that L1 denotes a distance between the base and a first position of the inclined member that is closest to the base; and
    L2 denotes a distance between the base and a second position of the inclined member that is farthest from the base.

10. The glass support member according to claim 1, further comprising:
    a reinforcing member that is arranged on the base adjacent to the column;
    wherein the reinforcing member is configured to restrict the swaying of the column with respect to the axis at a portion of the column toward the base.

11. The glass support member according to claim 1, further comprising:
    a second locking portion that is arranged on the second surface of the base;
    wherein the inclined member is inserted into a through hole of the body flange; and
    wherein the second locking portion is configured to face the body flange after the inclined member is inserted into the through hole of the body flange.

12. The glass support member according to claim 1, wherein the tip of the column is configured to be capable of swaying with respect to the axis substantially within a single plane including the axis.

13. The glass support member according to claim 1, wherein
    a first locking portion is arranged at the tip of the inclined member; and when the glass support member is engaged with a body flange, the first locking portion comes into contact with the body flange and a through hole of the body flange.

14. The glass support member according to claim 1, wherein the axis of the column is inclined with respect to an axis perpendicular to the base by an angle $\theta(0°<\theta<\pm45°)$.

* * * * *